Aug. 15, 1933.　　　F. K. KILIAN　　　1,922,098
CASTER CONSTRUCTION
Filed May 11, 1931
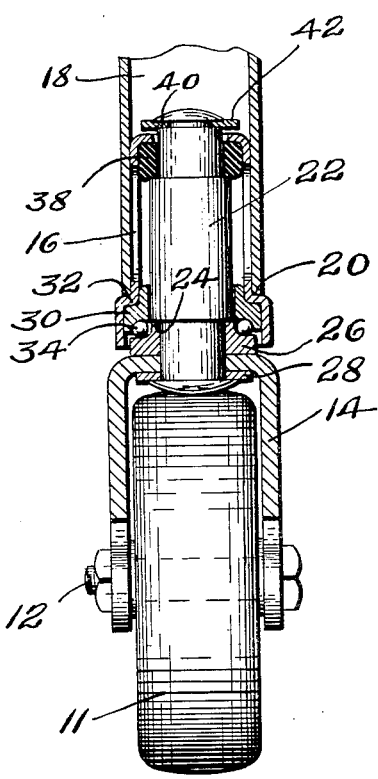
Fig-2-
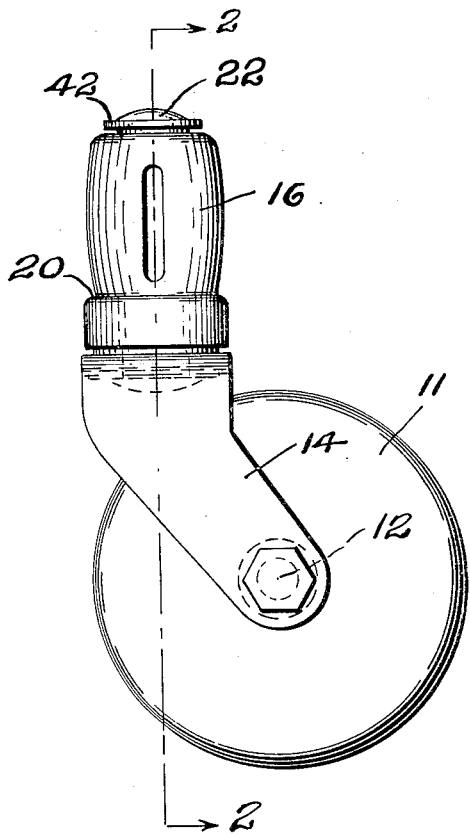
Fig-1-
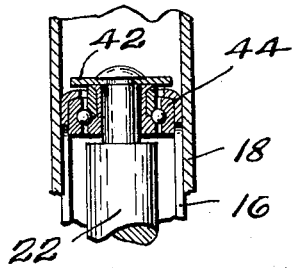
Fig-3-
INVENTOR.
Frederick K. Kilian
BY
Bodell & Thompson
ATTORNEYS.

Patented Aug. 15, 1933

1,922,098

UNITED STATES PATENT OFFICE 1,922,098

CASTER CONSTRUCTION

Frederick K. Kilian, Syracuse, N. Y.

Application May 11, 1931. Serial No. 536,471

1 Claim. (Cl. 16—21)

This invention relates to caster construction and particularly to the construction of swivel casters.

The principal object of this invention is to provide an anti-friction swivel caster of particularly simple design which is extremely economical to construct. A more particular object of the invention is to provide a ball bearing swivel caster in which the spindle is provided with a shoulder against which the inner ball raceway is clamped by riveting the end of the caster spindle, the same riveted end serving to hold the spindle connected to the caster fork.

A further object of the invention is to provide a swivel caster having a spindle and a sleeve with a bearing at the lower portion of the sleeve for carrying the upward thrust of the caster and the radial load at the lower end of the sleeve; and provided with a member in the upper end of the sleeve, composed of bearing material, for carrying the radial load at the upper end of the spindle. A further object of the invention is to provide an anti-friction bearing at the upper end of the sleeve for carrying the radial load in such an anti-friction swivel caster.

Other objects and advantages of the invention will appear and will be pointed out as the description proceeds.

The invention consists in the novel features and in the combinations and constructions hereinafter set forth and claimed.

In describing this invention, reference is had to the accompanying drawing in which like characters designate corresponding parts in all the views.

Figure 1 is a side elevation of a caster to which the invention is applied.

Figure 2 is a sectional view along the line 2—2 of Figure 1, the caster being shown inserted in a piece of furniture.

Figure 3 is a fragmentary sectional view showing a modified construction of a portion of the caster shown in Figure 2.

In its preferred embodiment the invention includes a caster wheel 11 rotatably mounted on an axle 12 carried by a caster fork 14 in the conventional manner. The caster is provided with a sleeve or socket 16 which is preferably of the expanding type so that when the caster is inserted within a leg 18 of a piece of furniture the sleeve or socket 16 will tend to expand into the barrel form shown in Figure 1 and this tendency to expand will cause sufficient friction to hold the sleeve 16 inserted within the leg 18 of a piece of furniture as shown in Figure 2.

The lower end of the sleeve 16 is provided with a shoulder 20 which limits the extent to which the sleeve may be inserted into the leg 18 of a piece of furniture. The construction thus far is conventional and forms no part of the present invention.

The caster is provided with a spindle 22 having a shoulder 24. An inner raceway member 26 is mounted on the spindle 22 and abuts against the shoulder 24. The caster fork 14 is mounted on the lower end of the spindle 22 and a washer 28 is mounted on the spindle below the fork 14 as shown in Figure 2. The lower end of the spindle 22 is riveted to clamp the washer 28, fork 14, and inner raceway member 26 together with the inner raceway member 26 abutting against the shoulder 24. This provides a very simple construction which unites the parts together to form a rigid unit.

An outer raceway member 30 is formed to fit within the sleeve 16 and this outer raceway member 30 has a shoulder 32 which contacts with the under side of the shoulder 20 to hold the outer raceway member 30 against upward movement with respect to the sleeve 16. The outer raceway member 30 is preferably a press fit in the sleeve 16, and is provided with an opening sufficiently large so that the spindle 22 may freely pass through the outer raceway member 30 with some clearance between the spindle 22 and outer raceway member 30.

The raceways formed in the raceway members 26 and 30 are designed so that balls 34, which are mounted between the raceway members, act as bearings to carry both the upward thrust of the spindle 22, and the radial load at the bottom of the spindle.

A member 38 is mounted in the upper portion of the sleeve 16 and may be a press fit within the sleeve, or otherwise held in position in the upper portion of the sleeve 16. The member 38 is constructed of material such as fibre, brass, or other suitable bearing material. This member 38 acts as a bearing to carry the radial load at the upper end of the spindle 22.

In the past it has been conventional practice to employ the upper end of the caster sleeve as a bearing to carry the radial load at the upper end of the pivot. The material of which a caster sleeve must necessarily be constructed is not well adapted to act as a bearing without lubrication. Since the upper end of the sleeve is in a position extremely difficult to keep lubricated the result in the past has been that the friction caused by the radial load on the upper end of the caster spindle has prevented free swiveling action of the caster. It will be obvious that with the construction of this invention it is possible to provide a high grade bearing for carrying the radial load at the upper end of the caster spindle and thus greatly reduce the friction and insure free swiveling action of the caster.

A shoulder 40 is formed on the upper end of the spindle 22 and a washer 42 is mounted on the upper end of the spindle abutting the shoulder 40 and secured in position by riveting the upper end portion of the spindle as shown in Figure 2. The washer 40 is larger than the opening in the top of the sleeve 16 through which the spindle 22 extends and consequently this washer 40 prevents the spindle 22 from moving downwardly with respect to the sleeve 16, and thus holds the caster assembled.

A modified form of the invention is shown in Figure 3 in which a ball bearing 44 is substituted for the member 38. The outer raceway of this ball bearing is secured to the sleeve 16 and the inner raceway mounted on the spindle 22. This ball bearing 44 carries the radial load at the top of the spindle 22 and operates with very little friction when used without lubrication.

From the foregoing description it will be apparent that this invention provides a swivel caster which may be constructed and assembled with a minimum amount of labor and which is provided with bearings at both the lower and upper end of the spindle so that the caster will freely swivel even though no lubrication is provided.

What I claim is:

An antifriction swivel caster including in combination an expansible and contractile sleeve, bearings at the upper and lower ends thereof, a spindle mounted in the bearings and a fork at the lower end of the spindle in which a caster wheel is mounted, the spindle having a shoulder near its upper end thrusting upward against the upper bearing, and the lower bearing including upper and lower sections, the latter thrusting against the head of the fork and the spindle having a shoulder thrusting against the upper side of the lower section, the sleeve having a shoulder thrusting downward against the upper section of the lower bearing, all whereby the spindle is rigidly secured to the fork, and the sleeve is capable of expanding and contracting relatively to the spindle and maintain the bearing at the upper end of the spindle.

FREDERICK K. KILIAN.